(12) United States Patent
Galbraith et al.

(10) Patent No.: US 6,390,220 B1
(45) Date of Patent: May 21, 2002

(54) MOTORCYCLE LUGGAGE RACK AND BACKREST ASSEMBLY

(75) Inventors: Stephen L. Galbraith, Mequon; Brian Sucharski, Franklin; Raymond W. Drea, Whitefish Bay, all of WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/362,590

(22) Filed: Jul. 28, 1999

(51) Int. Cl.[7] .............................................. B62D 61/02
(52) U.S. Cl. ................. 180/219; 280/288.4; 280/304.4; 224/415; 224/423; 297/215.1
(58) Field of Search ....................... 180/219; 280/288.4, 280/304.4, 304.3, 304.5, 202; 224/413, 419, 423, 427, 453, 415, 418; D12/115, 119; 297/195.1, 215.11, 243, 215.12, 215.1, 352

(56) References Cited

U.S. PATENT DOCUMENTS

| | | | | |
|---|---|---|---|---|
| 3,850,353 A | * | 11/1974 | Foulds ........................ | 280/202 |
| 4,030,750 A | * | 6/1977 | Abram .................. | 297/215.12 |
| 4,953,911 A | * | 9/1990 | Hanagan ................. | 297/215.12 |
| 5,299,832 A | * | 4/1994 | Price, Sr. .................. | 280/304.3 |
| 5,468,052 A | * | 11/1995 | Vaughn .................. | 297/215.11 |
| 5,544,937 A | * | 8/1996 | Hanagan ................. | 297/215.12 |
| 5,725,138 A | * | 3/1998 | Zagrodnik ................... | 224/413 |
| 5,984,331 A | * | 11/1999 | Wright ........................ | 280/202 |
| 5,997,088 A | * | 12/1999 | Stark et al. ............ | 297/215.11 |

FOREIGN PATENT DOCUMENTS

| | | | | |
|---|---|---|---|---|
| FR | | 2378672 | * 8/1978 | ............ 297/215.11 |

OTHER PUBLICATIONS

1987–1989 1340 Parts Catalog, pp. 118–119.
1997 Motorcycles—1 page (not numbered).
1998 Star Yamaha—2 facing pages (not numbered).
1998 Motorcycle & Riva Accessories Yamaha, pp. 10 and 13.
1989 Custom Chrome Catalog, pp. 333 and 350.

* cited by examiner

Primary Examiner—Daniel G. DePumpo
(74) Attorney, Agent, or Firm—Michael Best & Friedrich LLP

(57) ABSTRACT

A motorcycle that includes a luggage rack and/or backrest secured to a mounting bracket. The mounting bracket is positioned under the motorcycle seat and is secured to the rear fender of the motorcycle. Attaching the mounting bracket below the motorcycle seat conceals the mounting hardware that is used to secure the mounting bracket to the rear fender. Concealing mounting hardware on a motorcycle enhances the aesthetic appearance of the motorcycle.

17 Claims, 4 Drawing Sheets

MOTORCYCLE LUGGAGE RACK AND BACKREST ASSEMBLY

FIELD OF THE INVENTION

This invention relates to motorcycles, and more particularly to motorcycle luggage rack and backrest assemblies.

BACKGROUND OF THE INVENTION

Accessories are commonly added to a motorcycle in order to increase the utility of the motorcycle. For example, a backrest can be mounted to a motorcycle to provide support to drivers and/or passengers that are sitting on the motorcycle. Backrests are commonly mounted on brackets that are secured on opposing sides of the motorcycle seat, and/or behind the passenger seat.

A luggage rack is another example of an accessory that can be mounted to a motorcycle. Luggage racks permit riders to transport items using the motorcycle that would not otherwise have been possible. Luggage racks are typically mounted behind the driver seat or a passenger seat. Similar to backrests, luggage racks are commonly mounted on brackets that are secured on opposing sides of the motorcycle.

SUMMARY OF THE INVENTION

Motorcycle enthusiasts are often enamored with the aesthetic appearance of motorcycles. Therefore, it is undesirable to add accessories to a motorcycle that detract from the look of the motorcycle. The luggage racks and backrests mounted on existing motorcycles can detract from the look of the motorcycle because of the visible mounting hardware, which diminishes the aesthetic appearance of the motorcycle. In addition, the brackets that are often used to mount these accessories to opposing sides of the motorcycle can interfere with the operation of other accessories, such as the opening of saddlebags.

The invention is embodied in a motorcycle that includes a luggage rack secured to a mounting bracket that is positioned under the motorcycle seat and is secured to the rear fender of the motorcycle. Attaching the mounting bracket below the motorcycle seat conceals the mounting hardware, thereby enhancing the aesthetic appearance of the motorcycle.

In another form, the invention relates to a motorcycle that includes a backrest secured to a mounting bracket. The mounting bracket is positioned under the passenger seat of the motorcycle, and is secured to the rear fender of the motorcycle. Attaching the mounting bracket below the passenger seat advantageously conceals the mounting hardware that is used to secure the mounting bracket to the rear fender.

Other principal features and advantages of the invention would become apparent to those skilled in the art upon review of the following drawings, the detailed description and the attached claims.

DETAILED DESCRIPTION

Figure 1:
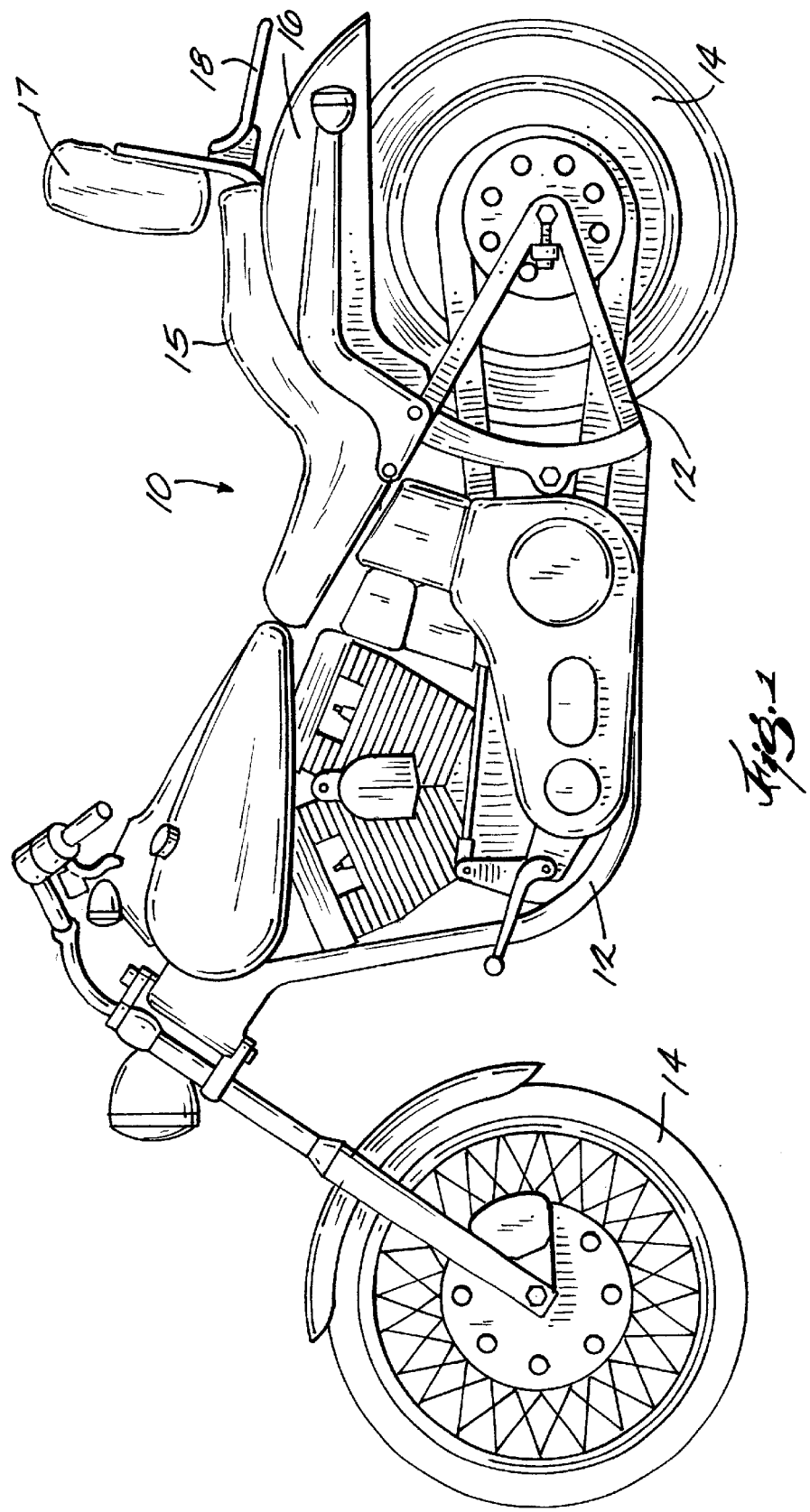
FIG. 1 is a side view of a motorcycle embodying the present invention.

The illustrated motorcycle 10 includes a frame 12, wheels 14, a seat 15, a rear fender 16, a backrest pad 17 and a luggage rack 18. The illustrated seat 15 includes a combined driver and passenger seat, although these seats are commonly formed separately on the motorcycle 10.

Figure 2:
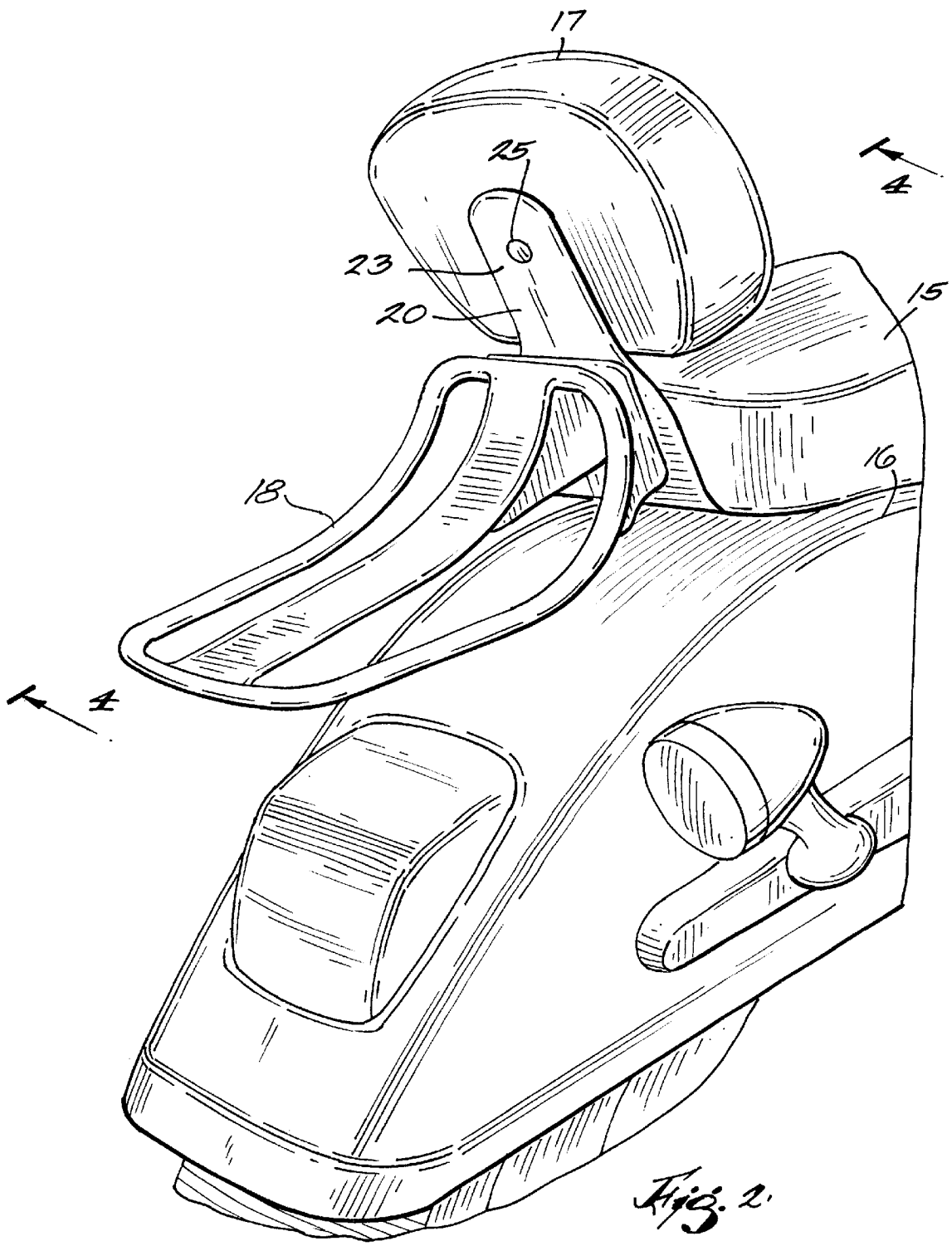
FIG. 2 is an enlarged rear perspective view of a portion of the motorcycle of FIG. 1 illustrating a luggage rack and a backrest.

As shown most clearly in FIG. 2, the seat 15 is positioned on the rear fender 16, and the backrest pad 17 is positioned above the seat 15, and the luggage rack 18 is positioned behind the seat 15. A mounting bracket 20 secures the luggage rack 18 and the backrest pad 17 to the rear fender 16. Mounting hardware is used to secure the mounting bracket 20 to the rear fender 16 below the seat 15 such that the mounting hardware is hidden from view. Concealing the mounting hardware improves the aesthetic appearance of the motorcycle.

Figure 3:
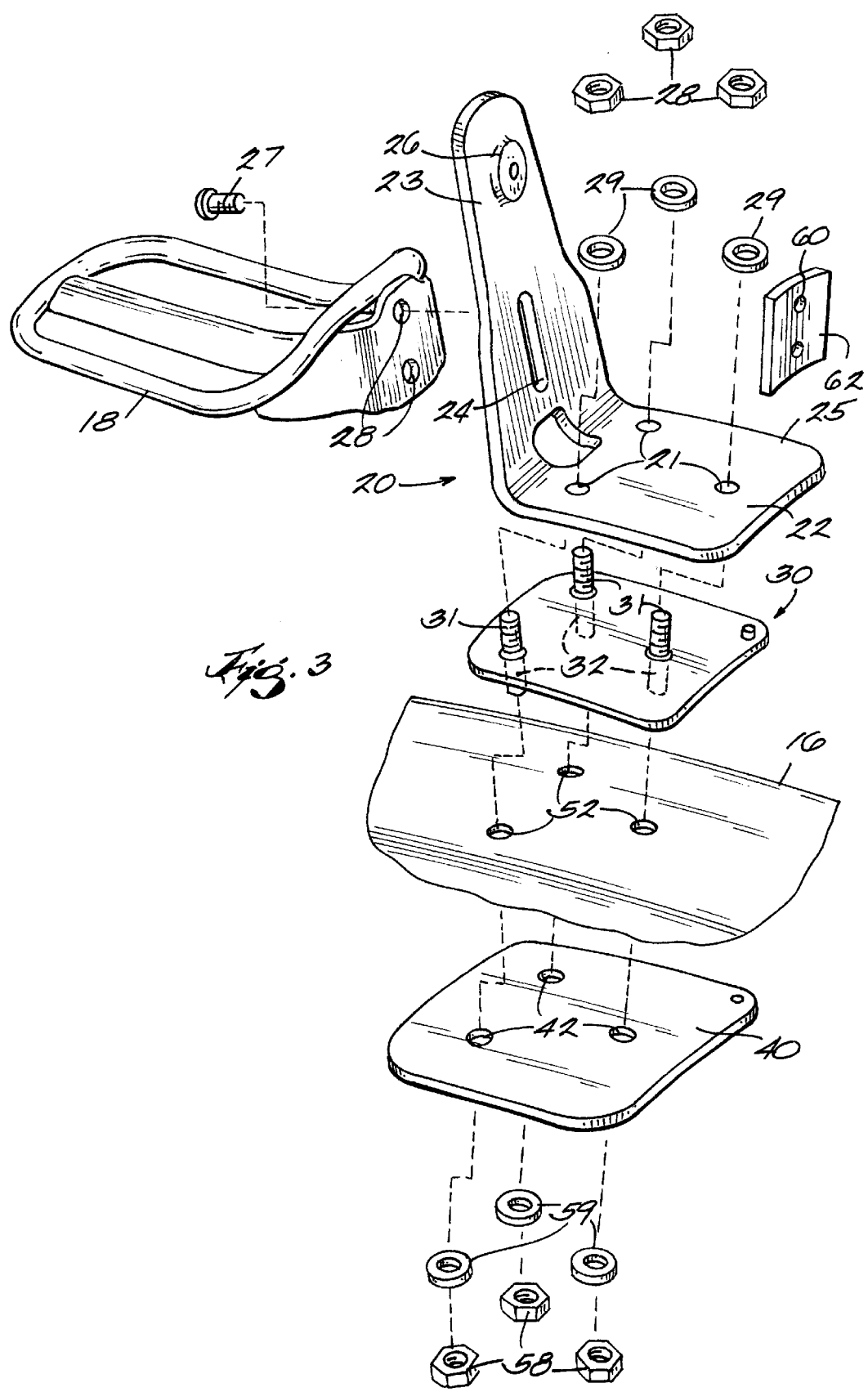
FIG. 3 is an exploded perspective view of the luggage rack and the backrest shown in FIG. 2.
Figure 4:
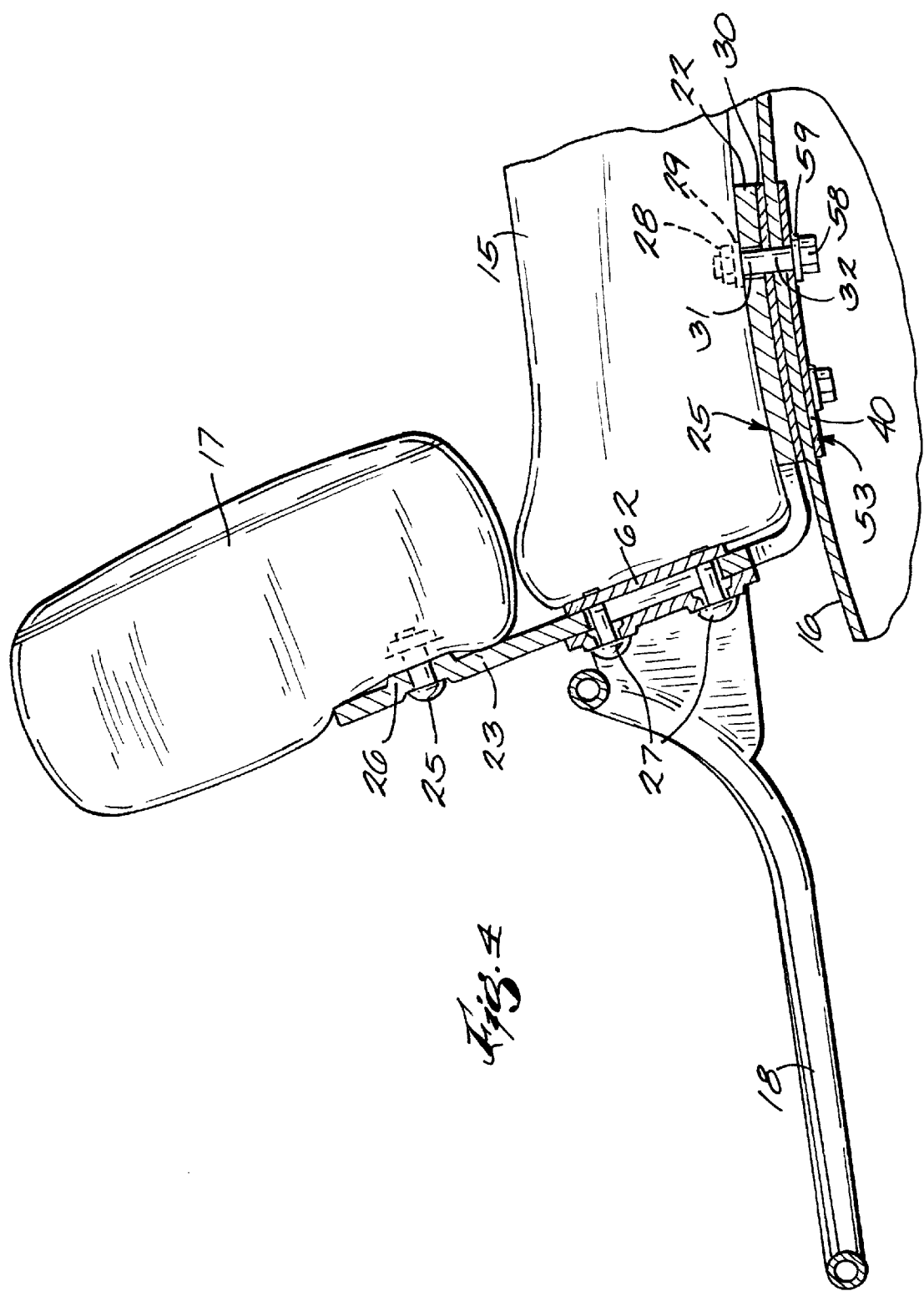
FIG. 4 is an enlarged, partially-sectioned side view of the luggage rack and the backrest shown in FIG. 2.

Referring to FIGS. 3 and 4, the mounting bracket 20 is L-shaped and includes a base section 22 and an upright section 23. The base section 22 of the mounting bracket 20 is secured to a stud plate 30. The stud plate 30 includes upwardly extending threaded studs 31 that pass through openings 21 in the mounting bracket. Conventional fasteners are threaded onto those portions of the threaded studs 31 that project above the upper surface 25 of the base section 22. Among the types of conventional fasteners that could be used to secure the stud plate 30 to the base section 22 are the nuts 28 and the washers 29 shown in FIG. 3.

The stud plate 30 also includes downwardly extending threaded studs 32. The downwardly extended threaded studs 32 extend through openings 52 in the rear fender 16 and then through openings 42 in a washer plate 40 that is positioned below the rear fender 16. The stud plate 30 is secured to the rear fender 16 by threading conventional fasteners onto those portions of the downwardly extending threaded studs 32 that extend past the lower surface 53 (see FIG. 4) of the washer plate 40. Among the conventional fasteners that could be used to secure the stud plate 30 to the rear fender 16, are the nuts 58 and the washers 59 shown in FIG. 3. As shown most clearly in FIG. 4, all of the mounting hardware (i.e., the stud plate 30, the nuts 28, 58 and the washers 29, 59) that is used to secure the base section 22 of the mounting bracket 20 to the rear fender 16 is below the seat 15.

The upright section 23 of the mounting bracket 20 extends upward from the rear fender 16 and is adapted to have the backrest pad 17 and the luggage rack 18 mounted thereon. The backrest pad 17 is secured near the top of the upright section 23 using a fastener 25 that is recessed within an emboss 26 in the upright section 23. The luggage rack 18 is secured near the bottom of the upright section 23 by using fasteners 27 that extend through openings 28 in the luggage rack 18, through a slot 24 in the upright section 23, and into threaded openings 60 in a mounting plate 62. The slot 24 in the upright section 23 provides an aesthetically pleasing opening on the mounting bracket 20 so that the mounting bracket 20 is visually appealing when the luggage rack 18 is not attached.

In the embodiment of the invention illustrated in the drawings, the backrest pad 17 and the luggage rack 18 are detachably mounted to the mounting bracket 20. It should be understood that a portion, or all, of either the backrest pad 17 or the luggage rack 18 could be integral with the mounting bracket 20 without departing from the scope of the present invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by particular applications or uses of the present invention. It is intended that the appended claims be construed to include alternative embodiments to the extent permitted by the prior art.

What is claimed is:

1. A motorcycle comprising:
    a frame;
    a front wheel and a rear wheel coupled to said frame;
    a rear fender coupled to said frame and positioned over said rear wheel;
    a seat coupled to said frame;
    a plurality of fasteners;
    a mounting bracket extending under said seat and coupled to said rear fender under said seat with said fasteners, wherein all fasteners used to secure said mounting bracket to said rear fender are under said seat and not visible during normal operation of said motorcycle; and
    a luggage rack secured to said mounting bracket.

2. The motorcycle of claim 1 wherein said mounting bracket is L-shaped and includes a base section and an upright section, said base section being secured with said fasteners to said rear fender under said seat of the motorcycle, said luggage rack being secured to said upright section.

3. The motorcycle of claim 2 further comprising a stud plate secured between said base section and said rear fender, wherein said plurality of fasteners includes a first threaded stud affixed to said stud plate and extending through an opening in said base section and wherein said plurality of fasteners includes a second threaded stud affixed to said stud plate and extending through an opening in said rear fender.

4. The motorcycle of claim 3 further comprising a washer plate positioned under said rear fender such that said second threaded stud extends through an opening in said washer plate.

5. The motorcycle of claim 4 wherein said stud plate includes a plurality of threaded studs extending through openings in said rear fender.

6. The motorcycle of claim 1 wherein said luggage rack is detachably mounted to said mounting bracket.

7. The motorcycle of claim 1 further comprising a backrest coupled to said mounting bracket.

8. A motorcycle comprising:
    a frame;
    a front wheel and a rear wheel coupled to said frame;
    a rear fender positioned over said rear wheel and coupled to said frame;
    a passenger seat positioned on said rear fender;
    a plurality of fasteners;
    a mounting bracket extending under said passenger seat of said motorcycle and coupled to said rear fender under said seat with said fasteners, wherein all fasteners used to secure said mounting bracket to said rear fender are under said seat and not visible during normal operation of said motorcycle; and
    a backrest secured to said mounting bracket.

9. The motorcycle of claim 3 wherein said mounting bracket is L-shaped and includes a base section and an upright section, said base section being secured with said fasteners to said rear fender under said passenger seat of the motorcycle, said backrest being secured to said upright section.

10. The motorcycle of claim 9 further comprising a stud plate secured between said base section and said rear fender, wherein said plurality of fasteners includes a first threaded stud affixed to said stud plate and extending through an opening in said base section and wherein said plurality of fasteners includes a second threaded stud affixed to said stud plate and extending through an opening in said rear fender.

11. The motorcycle of claim 10 further comprising a washer plate positioned under said rear fender such that said second threaded stud extends through an opening in said washer plate.

12. The motorcycle of claim 11 wherein said stud plate includes a plurality of threaded studs extending through openings in said rear fender.

13. The motorcycle of claim 9 wherein said backrest is detachably mounted to said mounting bracket.

14. A method of securing a luggage rack having a mounting bracket to a rear fender on a motorcycle, said method comprising the steps of:
    positioning the mounting bracket on the rear fender of the motorcycle;
    providing a plurality of fasteners;
    securing the mounting bracket to the rear fender using the fasteners;
    positioning a motorcycle seat over all the fasteners; and
    securing the motorcycle seat to the motorcycle such that the motorcycle seat conceals all of the fasteners such that all fasteners used to secure the mounting bracket to the rear fender are under the seat and not visible during normal operation of the motorcycle.

15. The method as claimed in claim 14 further comprising the step of connecting a backrest to the mounting bracket.

16. A motorcycle comprising:
    a frame;
    a front wheel and a rear wheel coupled to said frame;
    a rear fender positioned over said rear wheel and coupled to said frame;
    a passenger seat positioned on said rear fender, said passenger seat including a rear-facing surface having side edges and a width between the side edges;
    a mounting bracket having a first portion extending under said passenger seat of said motorcycle and coupled to said rear fender, and a second portion extending up from the first portion adjacent said rear-facing surface of said seat;
    a backrest supported by said second portion; and
    a luggage rack mounted in cantilever fashion to said second portion of said mounting bracket at a point between the side edges of said rear-facing surface.

17. The motorcycle of claim 16 wherein said second portion of said mounting bracket includes a slot, said motorcycle further comprising a fastener extending through said slot and through a portion of said luggage rack to achieve said cantilever mounting of said luggage rack.

* * * * *

UNITED STATES PATENT AND TRADEMARK OFFICE
CERTIFICATE OF CORRECTION

PATENT NO. : 6,390,220 B1
DATED : May 21, 2002
INVENTOR(S) : Stephen L. Galbraith et al.

It is certified that error appears in the above-identified patent and that said Letters Patent is hereby corrected as shown below:

Column 4,
Line 1, "claim 3" should be -- claim 8 --

Signed and Sealed this

Tenth Day of September, 2002

Attest:

JAMES E. ROGAN
Attesting Officer     Director of the United States Patent and Trademark Office